US007548370B2

(12) United States Patent
Albert et al.

(10) Patent No.: US 7,548,370 B2
(45) Date of Patent: Jun. 16, 2009

(54) LAYERED STRUCTURE FOR A TILE WAVE PLATE ASSEMBLY

(75) Inventors: Michael M. Albert, Stamford, CT (US); Justin Kreuzer, Trumbull, CT (US); Ronald A. Wilklow, Fairfield, CT (US)

(73) Assignee: ASML Holding N.V., Veldhoven (NL)

( * ) Notice: Subject to any disclaimer, the term of this patent is extended or adjusted under 35 U.S.C. 154(b) by 1008 days.

(21) Appl. No.: 10/878,040

(22) Filed: Jun. 29, 2004

(65) Prior Publication Data
US 2005/0286038 A1 Dec. 29, 2005

(51) Int. Cl.
G02B 27/28 (2006.01)
(52) U.S. Cl. .................. 359/489; 359/497; 359/501
(58) Field of Classification Search ............... 359/485, 359/489, 494, 497, 500, 501
See application file for complete search history.

(56) References Cited

U.S. PATENT DOCUMENTS

| | | | | |
|---|---|---|---|---|
| 3,719,415 | A * | 3/1973 | Rawson | 359/485 |
| 4,755,027 | A * | 7/1988 | Schafer | 359/487 |
| 5,442,184 | A | 8/1995 | Palmer et al. | |
| 6,191,880 | B1 | 2/2001 | Schuster | |
| 6,212,152 | B1 | 4/2001 | Aoyama et al. | |
| 6,392,800 | B2 * | 5/2002 | Schuster | 359/485 |
| 6,856,379 | B2 * | 2/2005 | Schuster | 355/71 |
| 6,885,502 | B2 * | 4/2005 | Schuster | 359/485 |
| 6,943,941 | B2 * | 9/2005 | Flagello et al. | 359/352 |
| 7,198,371 | B2 * | 4/2007 | Ishizaka et al. | 353/20 |
| 7,206,059 | B2 * | 4/2007 | Flagello et al. | 355/71 |
| 7,221,501 | B2 * | 5/2007 | Flagello et al. | 359/352 |
| 7,304,719 | B2 * | 12/2007 | Albert et al. | 355/71 |
| 7,324,280 | B2 * | 1/2008 | Albert | 359/489 |
| 7,382,535 | B2 * | 6/2008 | Hulsey | 359/497 |

FOREIGN PATENT DOCUMENTS

| | | |
|---|---|---|
| JP | 11-224437 A | 8/1999 |
| JP | 2002-287147 A | 10/2002 |
| JP | 2003-035822 A | 2/2003 |
| WO | WO 03/029856 A2 | 4/2003 |

OTHER PUBLICATIONS

Schellenberg, F., "A Little Light Magic," *IEEE Spectrum* 40:34-39, Institute of Electrical and Electronics Engineers (Sep. 2003).
Office Action and Translation of Office Action for Japanese Patent Application No. 2005-190704 mailed Nov. 11, 2008, 6 pgs.

* cited by examiner

*Primary Examiner*—David N Spector
(74) *Attorney, Agent, or Firm*—Sterne, Kessler, Goldstein & Fox P.L.L.C.

(57) ABSTRACT

The present invention relates to an apparatus for polarizing an incident light beam. In embodiments, a tile wave plate assembly is provided. The tile wave plate includes a layered structure having a substrate plate and two layers of mosaic tiles. The layers of the apparatus are mechanically separated to form a controlled gap spacing. The mosaic tiles can be configured to form a pseudo or true zero order wave plate.

19 Claims, 5 Drawing Sheets

LAYERED STRUCTURE FOR A TILE WAVE PLATE ASSEMBLY

BACKGROUND OF THE INVENTION

1. Field of the Invention

The invention relates to an apparatus for rotating the polarization of an entering light beam.

2. Background Art

In order to create faster and more sophisticated circuitry, the semiconductor industry continually strives to reduce the size of the circuit elements. The circuits are produced primarily by photolithography. In this process, the circuits are printed onto a semiconductor substrate by exposing a coating of radiation sensitive material to light. The radiation sensitive material is often referred to as a "photoresist" or just resist. Passing the light through a mask, which may consist of a pattern of chrome or other opaque material formed on a transparent substrate, generates the desired circuit pattern. The mask may also be formed by a pattern of higher and lower regions etched into the surface of a transparent substrate, or some combination of the two techniques. Subsequent thermal or chemical processing removes only the exposed or only the unexposed regions of the resist (depending on the material) leaving regions of the substrate bare for further processing which in turn produces the electronic circuit.

In lithography, projection exposure systems with a high numerical aperture are necessary in order to achieve the highest resolutions. Typically, light is coupled into the resist layer at relatively large angles. When this light is coupled in, the following occur: light losses because of reflection at the outer resist boundary layer and deterioration of the resolution because of lateral migration caused by reflections at the two boundary layers of the resist to the wafer and to the air (formation of standing waves).

In lithography, the polarization of the light can have a substantial impact on the imaging. For example, polarization at the reticle affects the lithographic performance of the lens in several ways. First, the interaction of the illumination with features of the reticle, for example, dense lines of chrome, varies with polarization. Accordingly, the transmission and scattering of the mask depend on the polarization of the light and the features of the mask. Second, reflections at the surfaces of the lenses and mirrors are polarization dependent so that the apodization and, to a lesser degree, the wave front of the projection optics ("P.O.") depend on polarization. Also, the reflection from the surface of the resist depends on polarization, and this too is effectively a polarization dependent apodization. Finally, the rays diffracted from the reticle that are brought back together at the wafer must interfere to produce an image. However, only parallel components of the electric field can interfere, so the polarization state of each ray at the wafer affects the coherent imaging. Even with a perfect lens, the three dimensional geometry of the rays arriving at the wafer can reduce the contrast.

One reason for considering a polarized illuminator, therefore, is to improve the image formed at the wafer by improving the interference of the diffracted rays at the wafer. This is particularly useful in high numerical aperture systems. For example, if dipole illumination is incident on a binary mask of dense lines each small region in the illuminator pupil (i.e. each pole of a low sigma dipole) is incoherent with other regions in the pupil and makes its own image at the wafer, so one can consider a single pole of the dipole illumination. The light diffracts from the reticle, and the dense lines produce tight diffraction orders. For small features, only two diffraction orders are accepted into the P.O. At the wafer, these diffraction orders recombine to form an image of the mask. For example, if the incident light is polarized so that these diffraction orders are P polarized at the wafer, the electric field of the two diffraction orders are not parallel, and they do not interfere well. On the other hand, if the diffraction orders are S polarized at the wafer, the electric field is parallel and the contrast is enhanced.

Accordingly, in lithography it is desirable to enhance contrast and improve imaging (or increase throughput and dose) at the wafer by controlling polarization at the relevant surfaces.

One approach is to provide a polarizing filter. Such conventional polarizing filters, however, act to polarize light uniformly across an exposure beam. No custom pattern of polarization is provided so that portions of an exposure beam are polarized differently. Further, such polarizers act to subtract light components which reduces transmissivity by at least 50%.

Another approach has been to provide a single layer of mosaic tiles that non-subtractively rotate light. Individual tiles are wave plate facets arranged to provide a limited radial polarization pattern. See, U.S. Pat. No. 6,191,880. Mosaic tiles made of birefringent material (such as naturally birefringent crystals) are especially vulnerable to differential rates of thermal expansion. This can prevent the tiles from being supported through optical contact. Non-contacted surfaces introduce an uncontrolled gap that can result in significant apodization (that is, intensity variation across the exposure beam). Moreover, tiles made of birefringent materials typically have very poor angular acceptance.

SUMMARY OF THE INVENTION

The present invention relates to an apparatus for polarizing an incident light beam. In embodiments, a tile wave plate assembly is provided. The tile wave plate includes a layered structure having two layers of mosaic tiles. The layers of the apparatus are mechanically separated to form a controlled gap spacing. The mosaic tiles can be configured to form a pseudo or true zero order wave plate.

Embodiments include lithographic systems having the tile wave plate assembly. Such tile wave plate assemblies according to the present invention have advantages in lithographic systems because they provide patterns of polarization that result in increased contrast and increased imaging at the wafer.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Reference will now be made to the drawings in which the various elements of the present invention will be given numerical designations and in which the invention will be discussed so as to enable one skilled in the art to make and use the invention.

The present invention provides an apparatus for polarizing an incident light beam. More specifically, the invention relates to a tile wave plate assembly comprising a layered structure having a substrate plate and two layers of mosaic tiles. The mosaic tiles are configured to form a pseudo zero order wave plate, and the layers of the apparatus are mechanically separated to form a controlled gap spacing.

The tile wave plate assembly non-subtractively rotates the polarization of an entering light beam. Conventional polarizers effect a selection that subtracts light components. In the optical arrangement of the invention, the direction of the linear polarization is, in effect, rotated.

Figure 1:
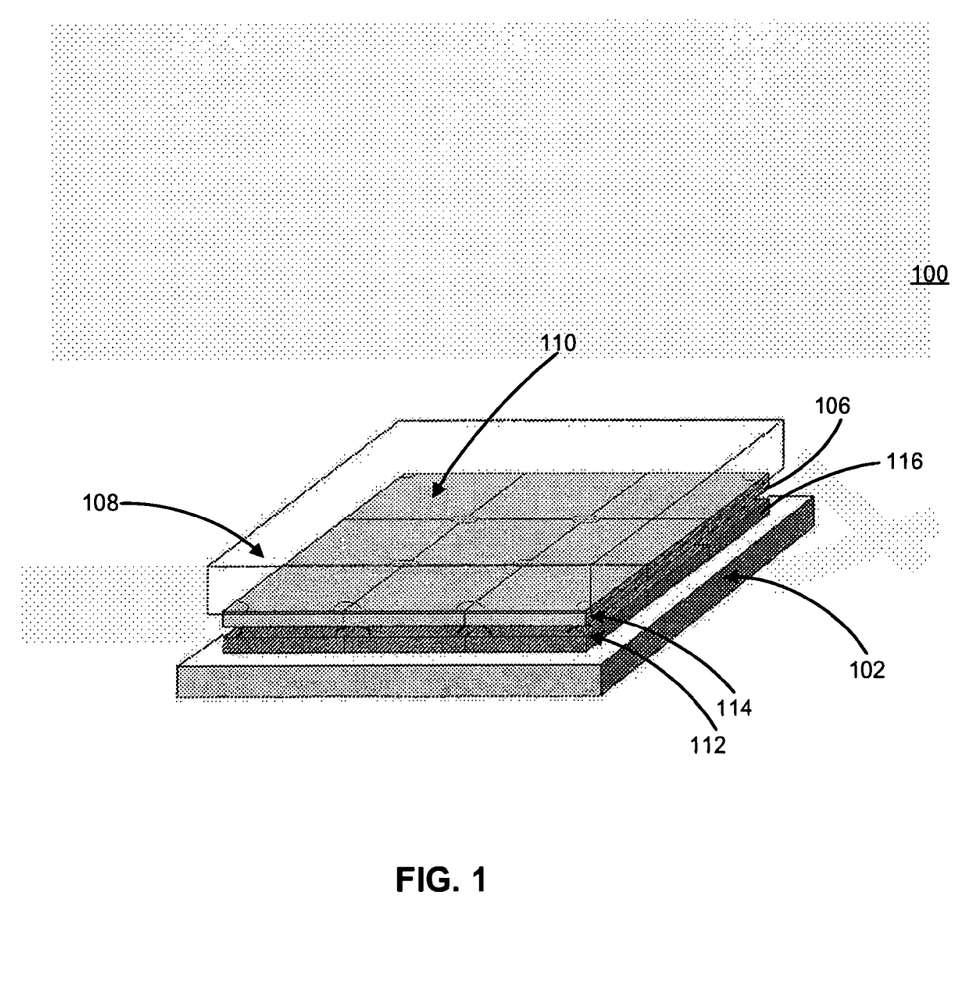
FIG. 1 is a diagram illustrating an embodiment of the tile wave plate assembly of the present invention.

In one embodiment, shown in FIG. 1, tile wave plate assembly 100 comprises layers 108, 106, 116 and 102. Layers 106 and 116 comprise a plurality of tiles 110, which can be naturally birefringent crystals, for example. Layers 102 and 108 are, respectively, a substrate plate and a cover plate. In particular embodiments, each layer 108, 106, 116, and 102 is mechanically separated by separation members 112 and 114. In further embodiments, selected layers, for example, birefringent layers 106 and 116 of tile wave plate assembly 100 are mechanically separated. In tile wave plate assembly 100 depicted in FIG. 1, layer 108 is on top of layer 106. Layer 106 is sandwiched between layers 108 and 116, and layer 116 is sandwiched between layers 106 and 102. Separation member 112 is located between layers 116 and 106, and separation member 114 is located between layer 108 and 106. One or more separation members can also be placed between layers 102 and 116.

Separation members 112 and 114 control the width or spacing of the gap between layers 108, 106, 116 and 102. Therefore, separation members 112 and 114 can be of any width desired to control the gap spacing between the layers. The invention encompasses any method of mechanical separation that allows for a controlled gap spacing of the layers. For example, separation members 112 and 114 can be microwires, lithographically grown pads or lithgraphically etched pads. In a certain aspect of the present invention, the microwires are metal and can be made from the following, including, but not limited to, aluminum, silver or gold.

Mechanical separation of layers 108, 106, 116, and 102 is advantageous in that the gap between the layers is controlled by separation members 112 and 114. Because layers 108, 106, 116, and 102 cannot be optically contacted because of the different rates of thermal expansion, particularly in high power applications, an uncontrolled gap would result if the layers were not mechanically separated. An uncontrolled gap between layers is undesirable because significant intensity variation along the cross section of the beam (i.e., apodization) can result from the uncontrolled gap spacing. Such intensity variation is undesirable because in, for example, lithographic applications, image contrast, image uniformity, etc. at the wafer can be compromised.

As noted, in particular embodiments, tile wave plate assembly 100 of the present invention can include birefringent layers 106 and 116, each of which is made from a mosaic of naturally birefringent crystals. Accordingly, birefringent layers 106 and 116 convert an entering light beam into an exiting light beam wherein the direction of the linear polarization is, in effect, rotated substantially over the entire cross section of the beam. Two birefringent layers 106 and 116 allow the mosaic tiles making up the layers to be crossed to produce a pseudo or actual zero order wave plate. Such wave plates can be made by aligning the fast axis of one of the birefringent materials with the slow axis of the second birefringent material. Because naturally birefringent crystals have many waves of retardation, the net birefringence can be extremely thermally sensitive. Crossing the birefringent materials compensates for temperature variations that tend to cancel by the crossing of birefringent layers 106 and 116.

For devices used at a wave length of 193 nm and above, one of birefringent layers 106 and 116 can be sapphire making the effective wave plate a true zero order wave plate. At 193 nm and above, the birefringence of sapphire has the opposite sign of quartz or magnesium fluoride. At these wavelengths, birefringent layers 106 and 116 can be made of two materials producing true zero order wave plates. The resulting structure has an excellent angular acceptance suitable for use in the pupil of a re-imaging optic where there are significant field angles. Birefringent layers 106 and 116 made of materials other than sapphire produce a pseudo zero order wave plate that is thermally stable. Accordingly, for UV applications birefringent layers 106 and 116 can be made of quartz, magnesium fluoride, or sapphire or other material or combination of materials transmissive to the illumination beam.

In particular embodiments, tile wave plate assembly 100 of the present invention further comprises a cover plate 102 and/or a substrate plate 108. The cover plate and substrate transmits light of a desired wavelength. For UV wavelengths, such materials include fused silica or calcium, fluoride. In embodiments, the plates serve as mechanical support for the tiles of the present invention. The present invention is not limited to plates 102, 108 and other types of mechanical support (such as optical glue) can be used.

Layers 108, 106, 116 and 102 in tile wave plate assembly 100 of the present invention use optics-quality materials that transmit light of a wavelength of interest. Accordingly, the invention is not limited to use with any particular wavelength of light. Example wavelengths are infrared, ultraviolet ("UV"), and visible. In example lithographic applications, wave plate assembly 100 of the present invention can be used with UV illumination.

Figure 2A:
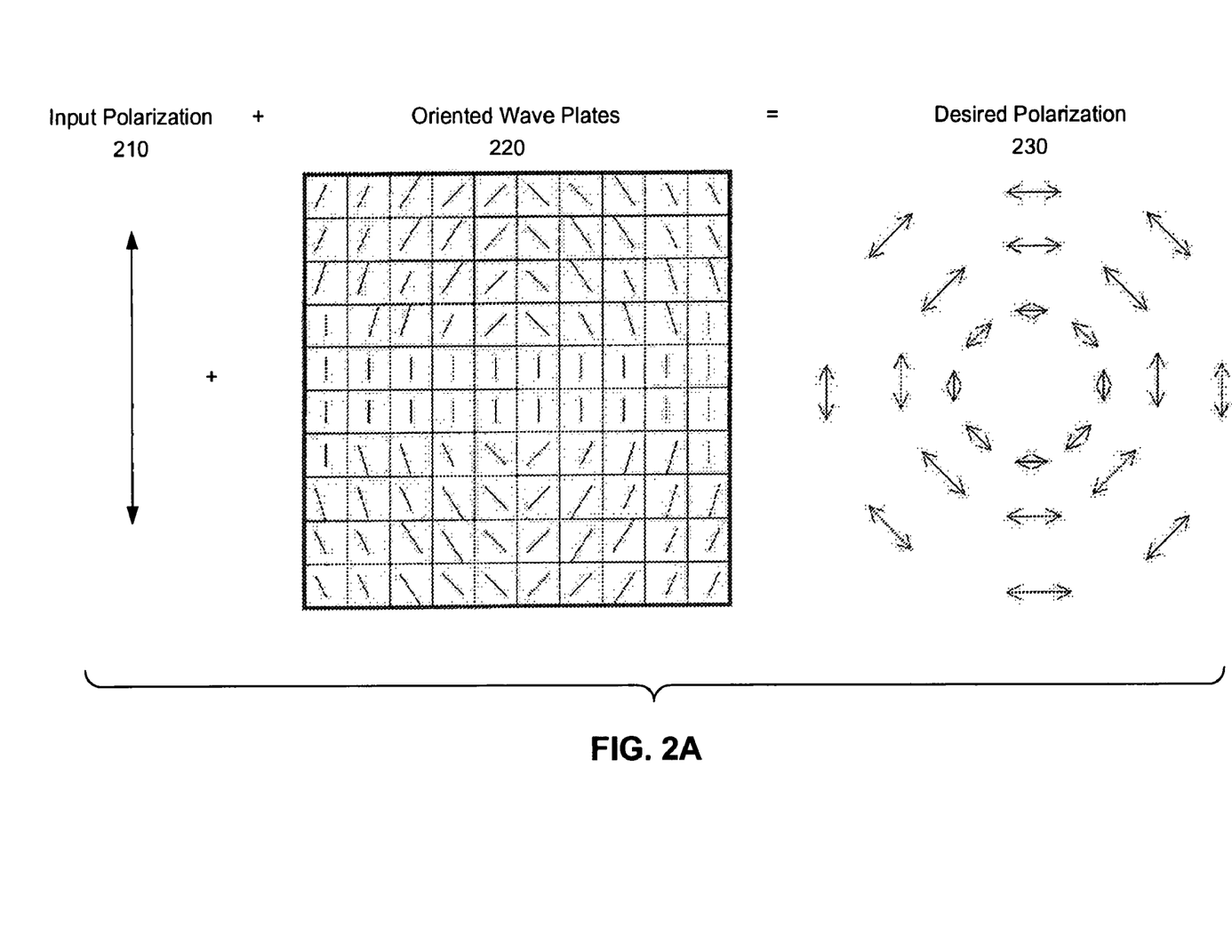
FIGS. 2A-2C are diagrams illustrating the effect of inputting a polarized beam into a tile wave plate assembly of the present invention to achieve sufficient patterns of polarization.
Figure 2B:
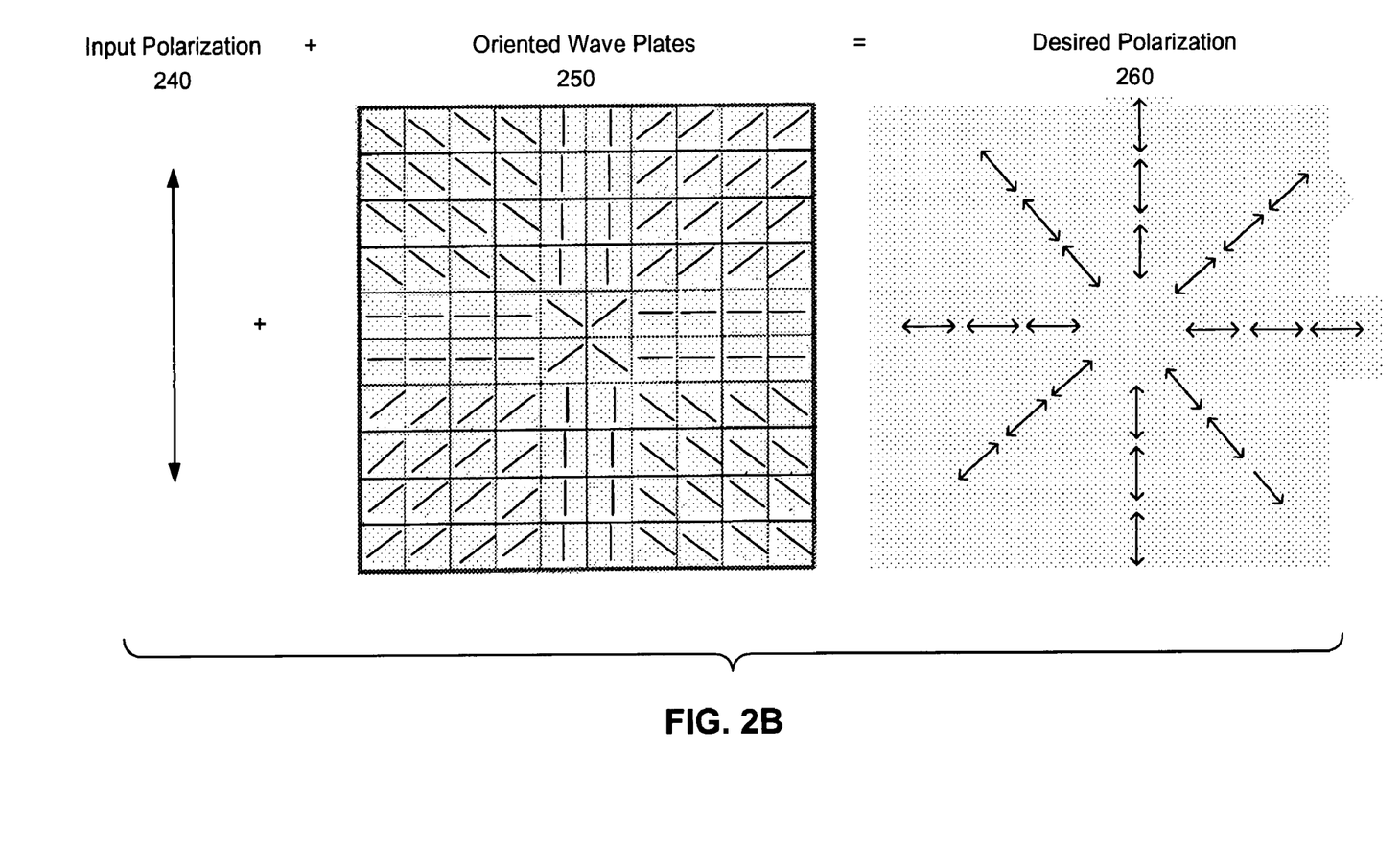
Figure 2C:
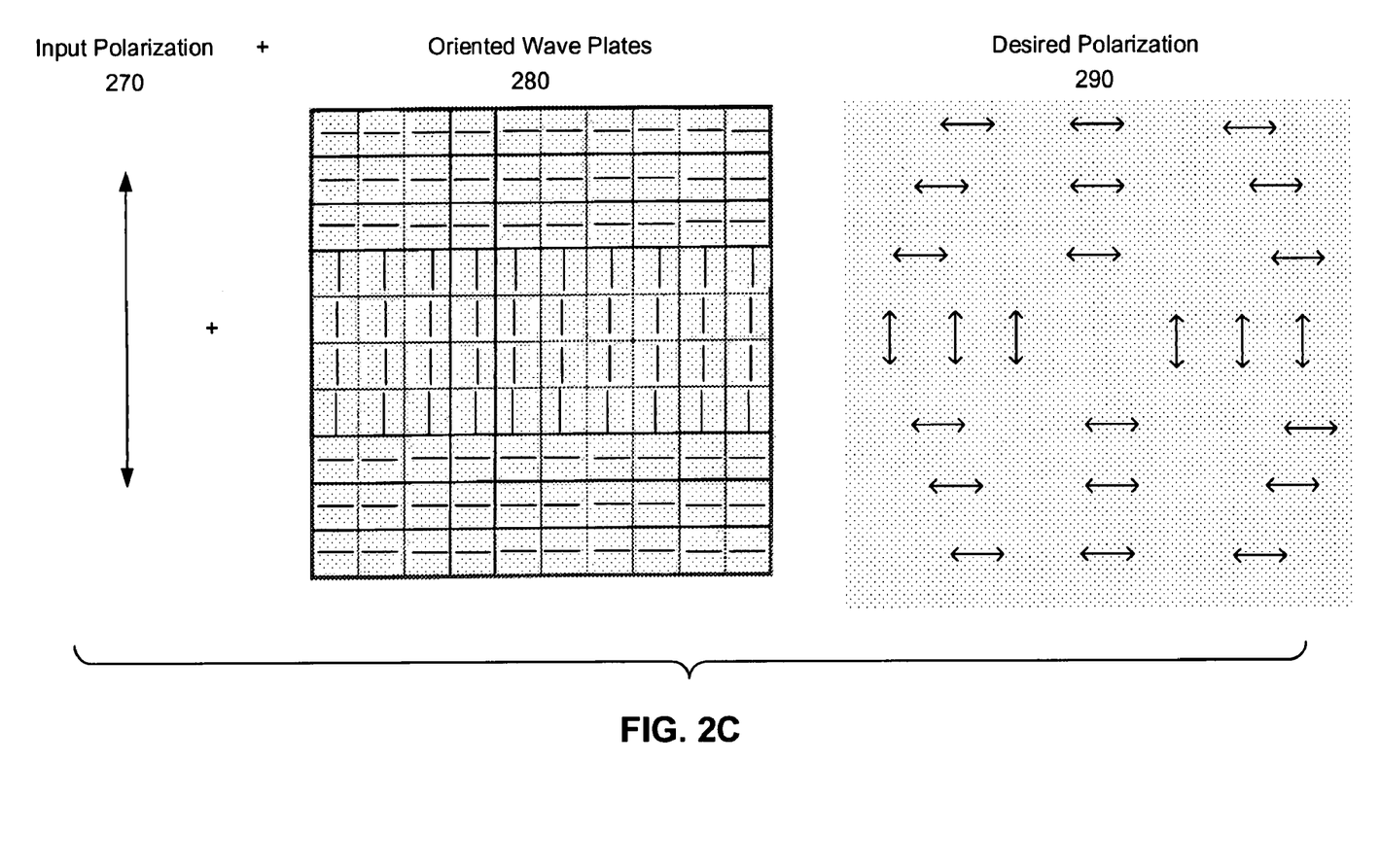

In the optical arrangements of the present invention a light source has a particular polarization and the tile wave plate assembly effects a change in that polarization. For example, FIGS. 2A-2C demonstrate that the configuration or orientation of the tiles making up the wave plate assemblies 220, 250 and 280 dictate the output, or desired polarization 230, 260 and 290. In FIG. 2A, input polarization 210 impinges the tile wave plate assembly 220 to output the desired tangential polarization 230. Depending on the configuration or orientation of the tiles (e.g., birefringent crystals) comprising the tile wave plate assembly 250, the desired polarization 260 can also be radial (FIG. 2B). Likewise, the desired polarization 290 can be customized by the arrangement of the birefringent crystals of the tile wave plate assembly 280 to comprise a combination of polarizations (FIG. 2C).

The present invention further includes an optical arrangement comprising a light source and a tile wave plate assembly of the present invention. In particular embodiments, the light source and the apparatus are in the same optical path. Further, the mosaic tiles of the present invention can be configured to form a pseudo or true zero order wave plate, and the layers of the apparatus are mechanically separated to form a controlled gap spacing.

In certain embodiments, the light source in the optical arrangement of the present invention produces a light beam having at least one wavelength within the ultraviolet (UV) spectrum. In particular embodiments, the light source produces a light beam having at least one wavelength between 180 nm and 400 nm.

In certain other embodiments, the optical arrangements of the present invention comprises a re-imaging optic that is further along the optical path than a wave plate of the present invention.

In additional embodiments, the optical arrangement of the present invention also comprises a half-wave plate that is further along the optical path than a tile wave plate assembly of the present invention. In other embodiments, the half-wave plate is prior in the optical path to a wave plate assembly of the present invention.

The invention further provides apparatuses that utilize the tile wave plate assemblies of the present invention. For example, the tile wave plate assemblies of the present invention can be used in apparatus for providing particular polarizations of UV light. Such an apparatus can, for example, comprise a source producing a light beam having at least one wavelength within the UV spectrum.

The tile wave plate assemblies of the present invention are particularly useful in the field of lithography, where polarized light allows greater contrast at the wafer and results in better imaging. In general, polarization affects lithography in four ways, (1) transmission and diffraction of reticle features; (2) Fresnel losses in the projection optics lens; (3) Fresnel reflection at the surface of the resist; and (4) vector interference. Taking all four factors in to consideration, a desired pattern of polarization for lithography for a particular reticle and illumination condition may vary.

Figure 3:
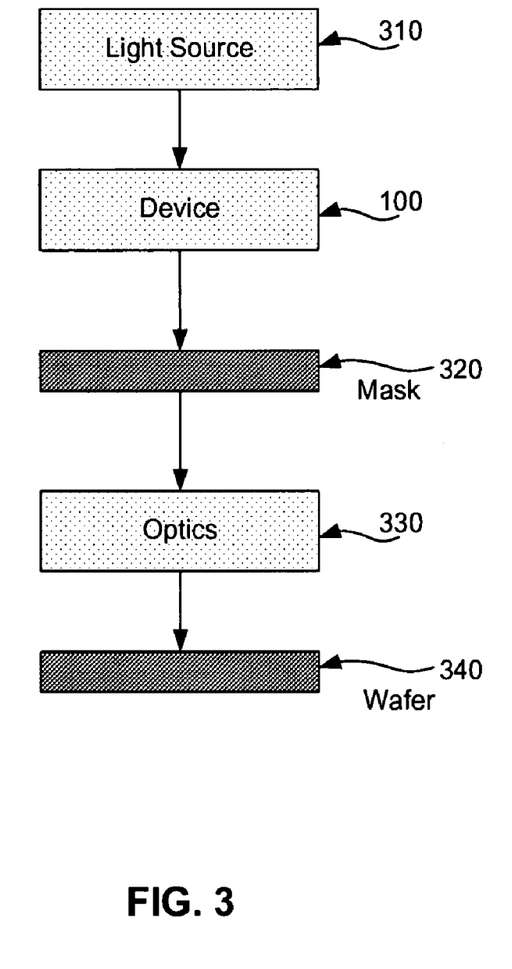
FIG. 3 is a diagram illustrating an embodiment of a lithographic system incorporating a tile wave plate assembly of the present invention.

The present invention therefore provides an optical lithography system for exposing a layer of radiation sensitive material on a semiconductor wafer that incorporates a tile wave plate assembly of the present invention. FIG. 3 shows a system that includes, but is not limited to, a source of radiant energy 310, a mosaic tile wave plate assembly 100, a mask 320, optics 330, such as a lens system, and the wafer which contains the radiation sensitive material 340. In an embodiment, radiant energy from the light source 310 is, in effect, rotated in a predetermined orientation by a mosaic tile wave plate assembly 100 of the present invention. The polarized radiant energy passes through mask 320 and exposes the layer of radiation sensitive material 340 in a predetermined pattern.

In the lithographic systems of the present invention that use a tile wave plate assembly of the present invention, improvements in the homogeneity and in the efficiency of coupling light into the resist layer is achieved because the reflection at the resist layer is reduced uniformly. However, uniform reduction is also achieved at all lenses arranged downstream of the polarizing element. For the light incident at large angles (up to the Brewster angle), the effect is the greatest especially where the light intensity (peripheral decay) is at the lowest. The disturbances of the resolution because of scattered light, even at the resist wafer boundary layer, are homogenized and reduced.

An optical arrangement wherein a tile wave plate assembly of the present invention is close to the start of the beam path is advantageous because the disturbances caused by stress-induced birefringence at all downstream lenses is minimized and made symmetrical.

For this reason, it is also advantageous for polarization filters, in addition to an apparatus of the present invention, when these elements are mounted in the illuminating system.

In another embodiment, the polarization-rotating elements are mounted at any desired location in a projection illuminating system which is characterized by improved homogeneity and a much higher efficiency compared to the state of the art.

In another embodiment, a reduction and homogenization of the scattered light occurs at each lens of the system. This is the case even at low angles of incidence.

While the best pattern of polarization for lithography may vary, tangential polarization 230 often can be the best choice. Reticles have repeated structures, usually horizontally or vertically across the mask. Structures are also repeated on the reticles at other orientations as well. Repeating structures can act like a one dimensional diffraction grating and diffract the light into a few tight beams in a row. If these beams interfere well when the beams are brought back together at the wafer, a good image will result. Very small features are the most difficult to image, and a repeating structure of the smallest features produces two diffraction orders at the opposite edges of the projection optics pupil. In general, the best polarization for imaging such features is the tangential polarization.

Similarly, radial polarization 260 has advantages in particular situations. For example, using radial polarization can minimize Fresnel losses which leads to greater light intensity. Radial polarization has advantages, therefore, when high intensity is desired. In one embodiment, radial polarization is desirable to image features that already have good contrast. On the other hand, in imaging features with limited contrast, which are usually the smallest features, tangential polarization would be desirable.

The invention includes, but is not limited to, lithographic systems with patterns of polarization as discussed above. The invention further encompasses optical systems where a variety of polarization patterns such as, for example, polarization 290, emerge from a wave plate of the present invention. Ideal polarization patterns depend upon the specific lithographic application. Such patterns are readily obtained by using software that generates a custom pattern depending on the lithographic application. Accordingly, the present invention provides optical systems which produce patterns that are specific to certain lithographic applications The present invention is not limited to lithography systems with optical systems producing the patterns of polarization described above or illustrated in the figures. Rather, for any given reticle, there is an optimal pupil fill and optimal polarization for printing. Accordingly, the present invention encompasses such optimal polarization patterns.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus, comprising:
a substrate plate; and
first and second layers of tiles configured to be aligned to produce a substantially zero order wave plate,
wherein the first and second layers of tiles have a fixed separation to form a controlled gap spacing.

2. The apparatus of claim 1, wherein said first and second layers of tiles are arranged in a raster, segment or facet configuration in a common plane.

3. The apparatus of claim 1, further comprising a cover plate.

4. The apparatus of claim 1, wherein said fixed separation of the first and second layers of tiles comprises using a mechanical separator comprising microwires, lithographically grown pads or lithographically etched pads.

5. The apparatus of claim 4, wherein said microwires include aluminum, silver or gold.

6. The apparatus of claim 1, wherein at least one of said first or second layers of tiles includes a material selected from the group consisting of sapphire, quartz and magnesium fluoride.

7. A lithographic apparatus, comprising:
an illumination system configured to supply a beam of radiation;
a wave plate assembly comprising a first and second layer of tiles which are aligned to produce a substantially zero order wave plate and which receive the beam of radiation;
a first support structure configured to support the first and second layers of tiles such that they are fixedly separated from each other;
a second support structure configured to hold a patterning device that is configured to pattern the beam of radiation after the beam as transmitted through the wave plate assembly; and
a projection system configured to project the patterned beam of radiation onto a substrate.

8. The lithographic apparatus of claim 7, wherein said illumination system produces the beam of radiation having at least one wavelength within the ultraviolet (UV) spectrum.

9. The lithographic apparatus of claim 7, wherein said illumination system produces the beam of radiation having at least one wavelength between 180 nm and 400 nm.

10. The lithographic apparatus of claim 7 further comprising a half-wave plate, wherein said half-wave plate is further along an optical path than said wave plate assembly.

11. The lithographic apparatus of claim 7, wherein the waveplate assembly is configured such that radially polarized light exits the apparatus.

12. The lithographic apparatus of claim 7, wherein the waveplate assembly is configured such that tangentially polarized light exits the wave plate assembly.

13. The lithographic apparatus of claim 7, wherein the first and second layers of tiles comprise birefringent material where a fast axis of the first layer of birefringent material is aligned with a slow axis of the second layer of birefringent material.

14. A method, comprising:
receiving a beam of radiation onto a substrate;
rotating a polarization of the beam of radiation transmitted through the substrate using a first layer of tile; and
rotating the polarization of the beam of radiation received from the first layer of tile using a second layer of tile,
wherein the first and second layer of tiles are aligned to produce a substantially zero order wave plate.

15. The apparatus of claim 1, wherein said first and second layers of tiles provide a stack of two separate birefringent layers to controllably polarize an input beam of radiation.

16. The apparatus of claim 15, wherein said birefringent layers are stacked with a spacing therebetween to form the substantially zero order wave plate on the substrate plate for providing a desired pattern of polarization by rotating direction of linear polarization of the input beam of radiation.

17. The apparatus of claim 16, wherein the substantially zero order wave plate and the substrate plate form a layered plate assembly in an optical path such that the layered plate assembly non-subtractively rotates the direction of linear polarization over a cross-section of the input beam of radiation.

18. The apparatus of claim 16, wherein said desired pattern of polarization to result in a relatively increased contrast and increased imaging at a wafer in a lithographic apparatus.

19. The method of claim 14, further comprising:
using the first and second layer of tiles to provide a stack of two separate birefringent layers at a spacing in an optical path to controllably polarize the beam of radiation for providing a desired pattern of polarization by rotating direction of linear polarization of the beam of radiation.

* * * * *

UNITED STATES PATENT AND TRADEMARK OFFICE
CERTIFICATE OF CORRECTION

PATENT NO. : 7,548,370 B2
APPLICATION NO. : 10/878040
DATED : June 16, 2009
INVENTOR(S) : Mike M. Albert et al.

It is certified that error appears in the above-identified patent and that said Letters Patent is hereby corrected as shown below:

In column 8, line 21, "a spacing therebetween" should be --a spacing there between--.

Signed and Sealed this

Eighteenth Day of August, 2009

David J. Kappos
*Director of the United States Patent and Trademark Office*